Jan. 5, 1960

M. E. WALBERG 2,919,754

TRACTOR IMPLEMENT CONNECTION

Filed July 11, 1955

Inventor
Maynard E. Walberg
by T. Lloyd LaFave
Attorney

Jan. 5, 1960   M. E. WALBERG   2,919,754
TRACTOR IMPLEMENT CONNECTION
Filed July 11, 1955   2 Sheets-Sheet 2

Inventor
Maynard E. Walberg
by T. Lloyd LaFave
Attorney

United States Patent Office 2,919,754
Patented Jan. 5, 1960

2,919,754

TRACTOR IMPLEMENT CONNECTION

Maynard E. Walberg, West Salem, Wis., assignor to Allis-Chalmers Manufacturing Company, Milwaukee, Wis.

Application July 11, 1955, Serial No. 521,186

6 Claims. (Cl. 172—7)

This invention relates to farm machinery and more particularly to the connection between tractor power lift arms and a tractor propelled implement.

It is important that power lift arms not only be readily connected to tractor drawn implements and that such connection permit relative angling between the tractor and implement, but also that such connection impose no unduly unequal stresses to the two lift arms at any one time and particularly during turning of the tractor and trailing implement. This is especially necessary in trail behind implements swingable laterally of the tractor about a hitch point disposed forwardly of the tractor rear axle when the rearwardly extending tractor lift arms are applying lift to the implement during turning of the tractor.

It is therefore an object of the present invention to provide improved means limiting the lateral swinging of a trailing implement relative to the tractor.

It is another object of the present invention to provide an improved power lift connection to implements of the type which have a laterally rigid and forwardly extending hitch tongue or draft pole to freely permit angling between the implement and tractor as the tractor negotiates a turn while applying lift to the implement.

Another object of the invention is to connect the laterally spaced power lift arms of a tractor to a single point on a trailing implement that permits limited lateral swinging of the implement relative to the tractor.

Another object of the invention is to connect the laterally spaced power lift arms of a tractor to an implement to apply lift to the implement and equally stress the lift arms at all times particularly while turning the tractor and implement.

Another object of the invention is to provide a lift arm connection to the implement draft bar which tends to center and align the draft pole relative to the tractor.

The foregoing objects and advantages are obtained by the present invention, various novel features of which will be apparent from the following description and accompanying drawings, in which:

Fig. 5 is a detail of a conventional device coupling the lift arms to the chain and pulley connector.

Figure 1:
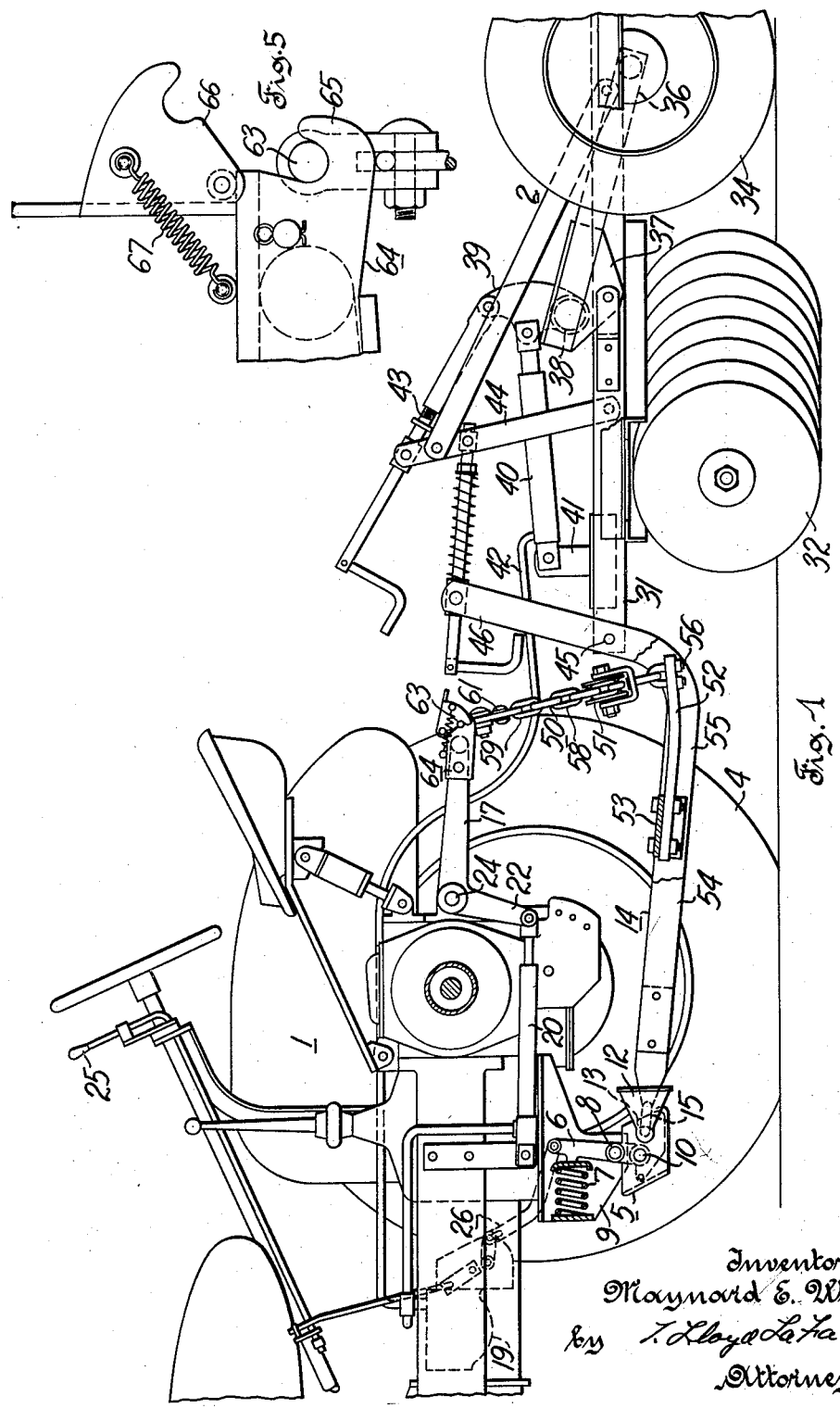
Fig. 1 is a side view, with portions broken away, of a tractor and a trailing implement combination showing a chain and pulley connection between the tractor lift arms and the implement to illustrate the present invention.
Figure 2:
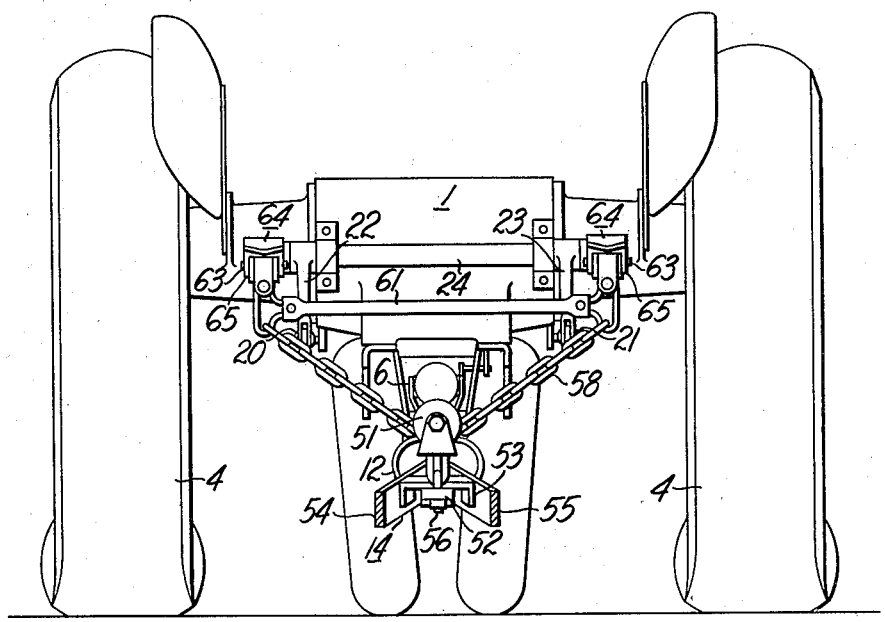
Fig. 2 is an end view of the tractor and lift connection of Fig. 1 taken in section through the pull bar.
Figure 3:
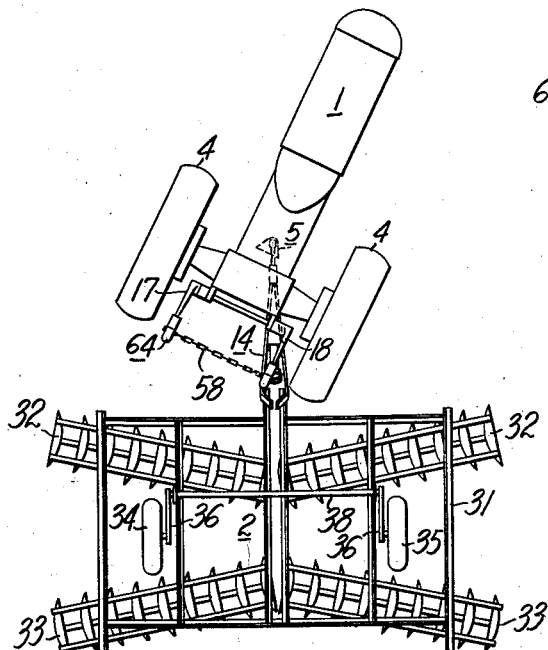
Fig. 3 is a plan view on a reduced scale showing the tractor and trailing implement of Fig. 1 making a right turn.

Referring to the drawings, Figs. 1, 2 and 3 illustrate the present invention as applied to an implement propelled by a tractor 1. The implement may be any of the type, such as a disk harrow 2, swingable laterally of the tractor about a hitch point on the tractor.

The tractor is conventional and comprises a power unit supported by rear wheels 4 and coupled in driving relation to the rear axle for these wheels. The tractor has a hitch yoke 5 depending from its main body to define a hitch point below and forwardly of the tractor rear axle. The hitch yoke comprises a draft control lever 6 biased by a spring 7. Lever 6 is pivotally supported on a rod 8 extending through a plate 9 rigid with the tractor. A transversely disposed pivot pin 10 at the lower end of lever 6 supports a quick hitch coupler having a funnel shaped housing 12 for receiving a forward end of the implement draft tongue or draft pole 14. The coupler has a vertically pivotal latch member 13 which detachably engages an eye 15 or loop in the forward end of the draft pole. The hitch connection permits the draft pole 14 to freely swing vertically and horizontally about the hitch yoke.

The tractor has power lift arms 17, 18 transversely spaced and extending rearwardly of the tractor. The lift arms are connected to a hydraulic actuating mechanism including a pump 19 deriving power from the tractor engine and rams 20, 21 pivotally mounted on the tractor and hinged to crank arms 22, 23 to pivot the lift arms on the axis of a shaft 24. The rams 20, 21 are connected to pump 19 through a supply line including a valve mechanism, not shown, controlled by a hand lever 25 selectively permitting manual control of the lift arms, or automatic control of the lift arms in response to changes in the propelling force required of the tractor. The draft responsive control valve, not shown, is operated by linkage 26 operatively connected to draft control lever 6 and to manual control lever 25. Such draft responsive mechanism is of the type shown and described in U.S. Patent 2,679,199, W. F. Strehlow, May 24, 1954.

The disk harrow 2 comprises substantially rigid frame supporting front and rear disk gangs 32 and 33 through suitable bearing brackets depending from the frame. A pair of laterally spaced vertically adjustable ground support wheels 34, 35 are disposed between front and rear disk gangs. L-shaped axles 36 for the harrow support wheels are supported on the implement frame for vertically swinging movement relative thereto. Laterally spaced plates 37 are pivotally mounted on the implement frame and are joined by a torsion member such as a cross shaft or tube 38 at a point in each pivot plate remote from its pivot with the frame. L-shaped axles 36 for the harrow wheels are supported by the pivot plates and torsion member to be swingable therewith. Means pivoting plates 37 on the frame 31 comprise a lever arm 39 rigidly secured to the cross shaft 38 and pivotally connected to one end of a hydraulic ram 40 whose other end is pivotally connected to an upright support 41 rigid with the frame 31. A fluid supply line 42 connects the harrow ram 40 to the hydraulic system of the tractor. A longitudinally adjustable screw 43 has one end pivotally connected to the lever arm 39 and its other end pivotally connected to a structure 44 rigid with the frame 31. Adjustment of screw 43 selects a limit or stop position for upward swinging of the wheels 34, 35 relative to the frame.

The implement draft pole 14 is connected to frame 31 by transverse pins 45 to make the draft pole vertically pivotal on the implement frame. A vertical extension 46 of the draft pole is pivotally connected remote from pins 45 to a longitudinally adjustable beaming screw which has its other end pivotally connected to upright structure 44 rigid with frame 31.

The disk harrow has been described as connected to the tractor in a conventional manner. Connection means are additionally provided between the implement and tractor to limit the angle that may occur therebetween upon turning of the tractor. While such connection 50 may be made between the power lift arms and the implement frame, it is preferably made, as shown, to the implement draft pole.

A single point connection is provided by a pulley 51 suitably connected to the draft pole remote from the forward or hitch end thereof, and is shown connected thereto through a shock absorbing buffer member such as a leaf spring 52. Leaf spring 52 extends longitudinally of the draft pole with its forward end secured to a cross plate 53 rigidly connected to diverging beams 54, 55 defining a portion of the draft pole adjacent the implement. The free rearwardly extending end of the leaf spring has a U-bolt 56 therein pivotally attaching the pulley 51 thereto. Load transmitting means providing a lost motion connection between the tractor lift arms and the implement may comprise a continuously flexible load transmitting chain like element such as a cable connected to the lift arms and pulley. Such lost motion connection is preferably provided, however, by a flexible connector such as a chain 58 looped to be rollably engaged by the wheel of the pulley. The ends 59, 60 of chain 58 are detachably connected either directly to the ends of tractor lift arms 17, 18, respectively, or as shown are connected to the ends of a stress equalizer such as a rigid bar 61 which fixedly spaces the ends of the chain 58.

The bar 61 includes knuckle pieces attached to opposite ends thereof and to which the chain ends are permanently attached. These knuckle pieces include latch pins or quick coupling studs 63 which are disposed in jaws 65 (Fig. 5) of socket structures 64 attached to the lift arms for receiving lift link connections. The socket structures 64 each include a latch member 66 biased by a spring 67 in overcenter positions to hold the latch member alternately open and closed. The bar 61 provides means securing the ends of the chain 58 to prevent the chain being removed from the pulley and from the implement, and by simply grasping bar 61 the chain lift connection may be positioned on the lift arms or removed therefrom.

Figure 4:
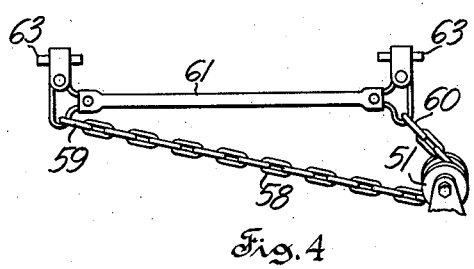
Fig. 4 is an end view of only the chain and pulley connection in the position it assumes in Fig. 3.

When the tractor propels the implement in a straight line in a field operating position, Figs. 1 and 2, with the disks in ground working position, the tractor and implement draft pole are longitudinally aligned, and the lift arms may be in lowered position and not applying tension to the lift chain. As the tractor then negotiates a right angle turn, Fig. 3, the draft pole 14 swings laterally about the tractor hitch yoke 5 toward a wheel 4 of the tractor. The pulley and chain move into the relative position shown, Figs. 3 and 4, with the chain forming a loop portion (Fig. 4) that prevents pulley 51 from moving further to the right, the chain limiting the lateral swing of the draft pole so that it does not contact the tractor wheel. For a turn to the right, as illustrated, the chain 58 would transmit greater lateral force on lift arm 17 than on lift arm 18, but rigid bar 61 equalizes the lateral thrust transmitted by ends of chain 58 so that the lift arms equally share the lateral load imposed thereon in limiting the angle between the tractor and implement upon negotiating a turn with the tractor.

In the field operating position with tractor and implement in line, Figs. 1 and 2, the tractor lift arms are shown as applying lift to the implement either manually in response to the position of control lever 25 or automatically in response to movement of draft control lever 6. In either case the lift arms, through lift chains 58, take up some of the resiliency of buffer leaf spring 52 and transfer implement weight to the driving wheels of the tractor. Upon tilting about a longitudinal axis of either tractor or harrow relative to one another, the lift chain slides back and forth through the pulley or the pulley rolls on the lift chain to permit such relative tilting while the chains are maintained under the predetermined tension dictated by the hydraulic control system. The relative movement of the chain and the pulley is such as to maintain the pulley centered between the horizontal spacing of the lift arms, tending to keep the draft pole from moving laterally out of longitudinal alignment with the tractor, and such centering causes the lift arms to apply substantially equal lift to the implement, while the bar 61 equalizes lateral reactive thrust on the lift arms.

The lift arms may be in a position to apply lift to the implement when the tractor negotiates a turn, Fig. 3. In making such a turn the vertical length of the lift chain becomes shortened tending to further lift the implement and to further limit the swing of the implement relative to the tractor. The hydraulic control mechanism of the type disclosed in the mentioned Strehlow patent operates to automatically maintain a substantially constant predetermined draft load on the tractor by raising and lowering the lift arms in response to increases and decreases, respectively, of the draft load. Shortening of the effective vertical length of the lift chain 58, during a turn, will obviously decrease the draft load. When the control mechanism responds in its normal manner to such decrease of the draft load, the lift arms lower to maintain only the called for lift to the implement and thereby permit full lateral swinging of the implement relative to the tractor. In other words when the tractor turns, the implement swings laterally while the lift arms of said power lift lower the load transmitting means or flexible member relative to said implement. The flexible member is of a length that forms a loop that limits the lateral swing of said pulley to prevent said implement from angling into the rear wheels of said tractor during said turns when said lift arms are in lowered position.

The chain and pulley and rigid cross bar described provide not only a flexible lift connection between tractor lift arms and trailing implement but also means limiting lateral swing of the implement relative to the tractor, and means tending to center and align the implement relative to the tractor. Such chain, pulley and crossbar also make the lift arms transmit substantially equal lift to the implement and equally share lateral stress load on the lift arms for all positions of the implement relative to the tractor.

While the embodiment of the invention has been shown relative to a disk harrow having a ground support wheel, it should be obvious that the invention may be applied to other tractor attached implements, and that various modifications within the scope of the appended claims may readily occur to those skilled in the art.

It is claimed and desired to secure by Letters Patent:

1. In combination with a tractor having a power lift including laterally spaced power lift arms extending rearwardly of the tractor, an implement frame connected in universally swingable draft transmitting relation with said tractor, ground engaging supporting means connected with said implement frame, and load transmitting means adapted to transfer weight from said implement frame to said tractor upon operation of said power lift, said load transmitting means including a flexible lift force transmitting element operatively connected at its opposite ends, respectively, with said lift arms, and a pulley rollably engaged by said flexible element and mounted in lift force transmitting relation on said implement frame for swinging movement therewith relative to said tractor, said flexible element and pulley being effective to limit angling of said implement frame relative to said tractor.

2. In combination with a tractor having a power lift including laterally spaced rearwardly extending lift arms, a trailing implement, a draft pole hitched to said tractor forwardly of said lift arms, said draft pole being substantially rigid laterally with a frame of said implement and swingable both laterally and vertically of said tractor, ground engaging supporting means connected with said implement frame, and load transmitting means adapted to transfer weight from said implement frame to said tractor by operation of said power lift, said load transmitting means including a stress equalizer mounted to interconnect the rearwardly extending end portions of said lift arms, a flexible lift force transmitting element operatively connected at its opposite ends, respectively, with said lift arms, and a pulley engaged by said flexible element and mounted on said trailing implement remote from the forward end of said draft pole for swinging movement therewith relative to said tractor, said flexible element and pulley being effective to limit angling of said tractor relative to said trailing implement and said stress equalizer being effective to distribute lateral stresses equally to said lift arms.

3. In combination with a tractor having a power lift including laterally spaced rearwardly extending lift arms, a trailing implement having a draft pole hitched to said tractor forwardly of said lift arms, said draft pole being substantially rigid laterally with said implement and swingable both laterally and vertically of said tractor, and load transmitting means adapted to transfer weight from said implement frame to said tractor by operation of said power lift, said load transmitting means including a rigid bar interconnecting the ends of said lift arms, a pulley connected to a forward portion of said trailing implement for swinging movement therewith relative to said tractor, and a flexible connector rollably engaged by said pulley and having ends secured to end portions of said bar, said flexible connector cooperating with said pulley so as to limit angling of said implement relative to said tractor and said bar cooperating with said connector and power lift arms to equally distribute to said power lift arms lateral stresses produced upon turning said tractor with said implement in a lowered ground engaging position.

4. An agricultural machine of the type wherein a tractor provides the propelling force for a trailing implement, said tractor having a source of power and a power lift including laterally spaced rearwardly extending lift arms, said implement comprising a frame and a draft pole substantially rigid laterally therewith, hitch means connecting said draft pole with said tractor for vertical and lateral swinging movement of said implement relative to said tractor, a leaf spring disposed longitudinally of said draft pole with one end rigidly secured thereto, a pulley pivotally mounted on the free end of said leaf spring, and a chain rollably engaged by said pulley with the ends of said chain laterally spaced and secured to a rigid crossbar detachably secured to said power lift arms, said chain, pulley and crossbar being effective to limit angling of said tractor relative to said implement and to equally distribute to said power lift arms lateral stresses incurred upon turning movement of said tractor with said implement in ground engaging position.

5. An implement adapted for connection in semi-mounted trailing relation with a tractor having laterally spaced power lift arms extending rearwardly of the tractor, said implement comprising a ground engaging supporting means connected with a frame of said implement, a rigid forwardly extending draft tongue having a forward end for connection in universally swingable draft transmitting relation with the tractor, a leaf spring disposed longitudinally of said draft tongue with one end rigidly secured thereto at a point spaced from the forward end, a pulley pivotally mounted on the free end of said leaf spring, and a load transmitting means adapted to transfer weight from said implement to said tractor upon operation of said power lift arms, said load transmitting means including a stress equalizer having end portions adapted for detachable connection to the power lift arms of the tractor and a chain rollably engaged by said pulley with the ends of said chain secured to said end portions of said stress equalizer, said chain having a length such that when said draft tongue is hitched to the tractor and said stress equalizer is connected to the power lift arms said pulley will be movable along said chain to permit angling of said tractor relative to said trailing implement for turning movement of the tractor and tensioning of said chain by said pulley will limit said angling to a predetermined extent while lateral stresses are distributed equally to said power lift arms by said stress equalizer.

6. In combination: a tractor having a power lift including spaced power lift arms extending rearwardly of the tractor; a semimounted implement connected in universally swingable draft transmitting relation with said tractor; and connecting means connecting said implement and said lift arms, said connecting means including load transmitting means, said load transmitting means being subject to raising and lowering by operation of said lift arms during the time said implement is in ground engaging position and said power lift being operative to lower said lift arms in response to turning of said tractor relative to said implement; said load transmitting means being of a length that limits the lateral swing of said implement to prevent angling of said implement into the rear wheels of said tractor during said turning of said tractor when said lift arms are in lowered position.

References Cited in the file of this patent

UNITED STATES PATENTS

| | | |
|---|---|---|
| 2,345,741 | Foulke | Apr. 4, 1944 |
| 2,420,530 | Evans | May 13, 1947 |
| 2,620,716 | Ciancio | Dec. 9, 1952 |
| 2,637,260 | Silver et al. | May 5, 1953 |
| 2,693,969 | Simpson | Nov. 9, 1954 |
| 2,723,613 | Walberg | Nov. 15, 1955 |

FOREIGN PATENTS

| | | |
|---|---|---|
| 90,755 | Austria | Jan. 10, 1923 |